United States Patent
Vu et al.

(10) Patent No.: US 11,309,702 B2
(45) Date of Patent: Apr. 19, 2022

(54) SYSTEMS AND METHODS FOR ISLANDING PROTECTION

(71) Applicant: Hitachi Energy Switzerland AG, Baden (CH)

(72) Inventors: Khoi Vu, Cary, NC (US); Salman Khalid Gill, Raleigh, NC (US)

(73) Assignee: HITACHI ENERGY SWITZERLAND AG, Baden (CH)

( * ) Notice: Subject to any disclaimer, the term of this patent is extended or adjusted under 35 U.S.C. 154(b) by 431 days.

(21) Appl. No.: 16/287,571

(22) Filed: Feb. 27, 2019

(65) Prior Publication Data
US 2019/0267794 A1 Aug. 29, 2019

Related U.S. Application Data

(60) Provisional application No. 62/636,136, filed on Feb. 27, 2018.

(51) Int. Cl.
*H02H 3/00* (2006.01)
*H02H 3/38* (2006.01)
*H02H 1/00* (2006.01)

(52) U.S. Cl.
CPC ............ *H02H 3/38* (2013.01); *H02H 1/0007* (2013.01)

(58) Field of Classification Search
CPC .......... H02H 3/38; H02H 3/40; H02H 1/0007; H02J 3/381; H02J 3/388
USPC .......................................................... 361/79
See application file for complete search history.

(56) References Cited

U.S. PATENT DOCUMENTS

| | | | |
|---|---|---|---|
| 6,219,591 B1 | 4/2001 | Vu et al. | |
| 6,219,623 B1 * | 4/2001 | Wills | H02J 3/383 702/60 |
| 6,249,719 B1 | 6/2001 | Vu et al. | |
| 6,690,175 B2 * | 2/2004 | Pinzon | H02J 3/24 324/525 |
| 2018/0152022 A1 * | 5/2018 | Manson | H02J 3/14 |

OTHER PUBLICATIONS

A. Leirbukt et al., "Voltage Monitoring and Control for Enhanced Utilization of Power Grids," IEEE PES Power Systems Conference & Exposition, Oct. 10-13, 2004, pp. 342-347.

* cited by examiner

*Primary Examiner* — Jared Fureman
*Assistant Examiner* — Lucy M Thomas
(74) *Attorney, Agent, or Firm* — Slater Matsil, LLP

(57) ABSTRACT

Illustrative embodiments of systems and methods for detecting and responding to islanding of distributed energy resources are disclosed. In at least one illustrative embodiment, a method may include measuring voltage and current at a connection point between a distributed energy resource and an electrical grid, determining a Thévenin impedance of the electrical grid based upon the voltage and current measurements, and determining whether the Thévenin impedance has exceeded a predetermined threshold. In some embodiments, the method may further include disconnecting the distributed energy resource from the electrical grid in response to determining that the Thévenin impedance has exceeded the predetermined threshold.

16 Claims, 7 Drawing Sheets

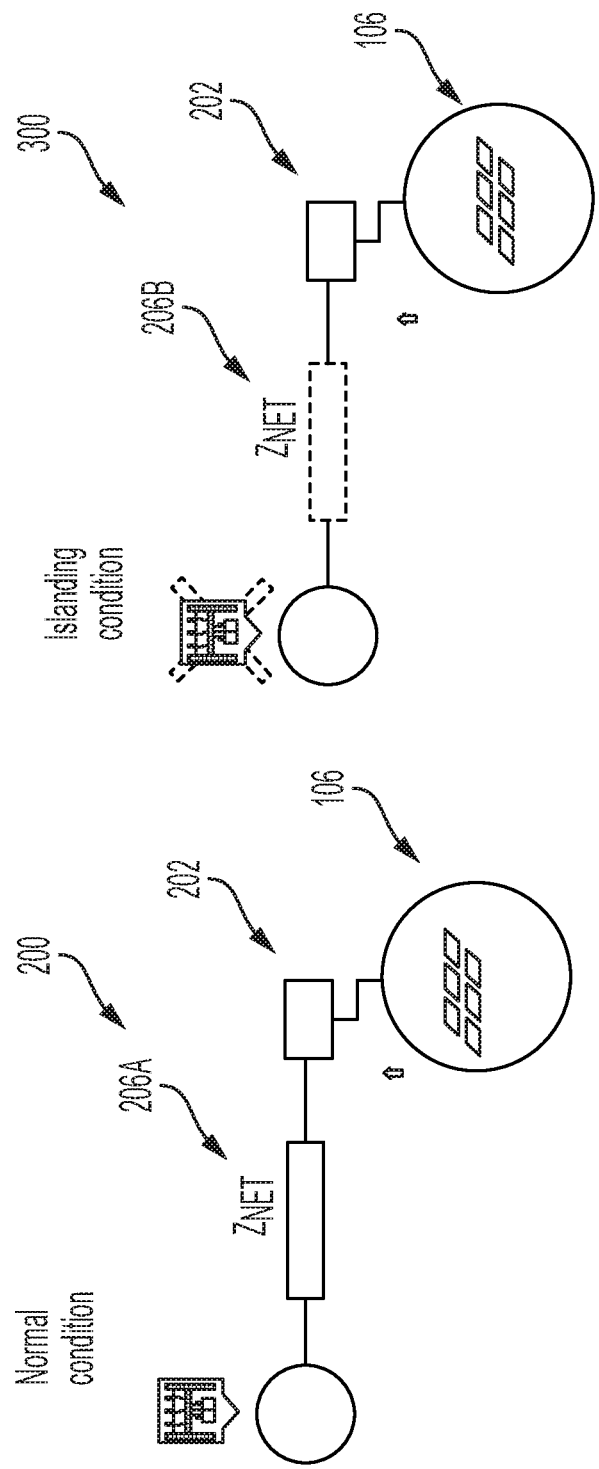

SYSTEMS AND METHODS FOR ISLANDING PROTECTION

CROSS-REFERENCE TO RELATED APPLICATIONS

This application claims the benefit of U.S. Provisional Patent Application No. 62/636,136, filed Feb. 27, 2018, the entire disclosure of which is incorporated herein by reference.

TECHNICAL FIELD

The present disclosure relates to the systems and methods for detecting and responding to islanding of distributed energy resources.

BACKGROUND

Electrical substations are often able to determine when damage occurs to the power lines located in their respective areas of the electrical grid. This damage may present a danger to the entire electrical grid and/or to people near the damaged area. In order to prevent further damage, the electrical substation may activate specific relays in order to isolate the damaged area from the remainder of the grid. The damaged area can be safely repaired once the power has been disconnected.

Islanding occurs when a Distributed Energy Resource (DER) continues to provide power to a subsection of the electrical grid after it has been isolated from the remainder of the electrical grid by an electrical substation. DERs are decentralized power supplies that are typically located close to the systems they serve. By way of illustrative example, DERs may include solar panels, hydro systems, wind turbines, geothermal power systems, biomass power systems, diesel generators, and/or any other systems capable of producing and/or storing electrical power. Islanding endangers both the utility workers attempting to fix the damaged area and electrical devices connected to that subsection of the gird. DERs must disconnect from their subsection of the electrical grid once it has been isolated in order to prevent possible dangerous situations.

Power companies have typically required owners of DERs to install Direct Transfer Trip (DTT) systems as a safety measure. The DTT system disconnects all DERs when the distribution circuit to which the DERs are connected is unexpectedly isolated from the main grid (i.e., unintentional islanding). DTT requires the electrical substation to send messages directly to each DER. The DTT system is costly because it requires data communications systems to be built at every DER, and is difficult to adapt to frequent changes to distribution circuits' topology.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which:

FIG. 2 is a simplified diagram illustrating a Thévenin equivalent circuit seen by a DER under a normal condition;

FIG. 3 is a simplified diagram illustrating the Thévenin equivalent circuit seen by a DER under an islanding condition;

DETAILED DESCRIPTION OF THE DRAWINGS

Figure 1:
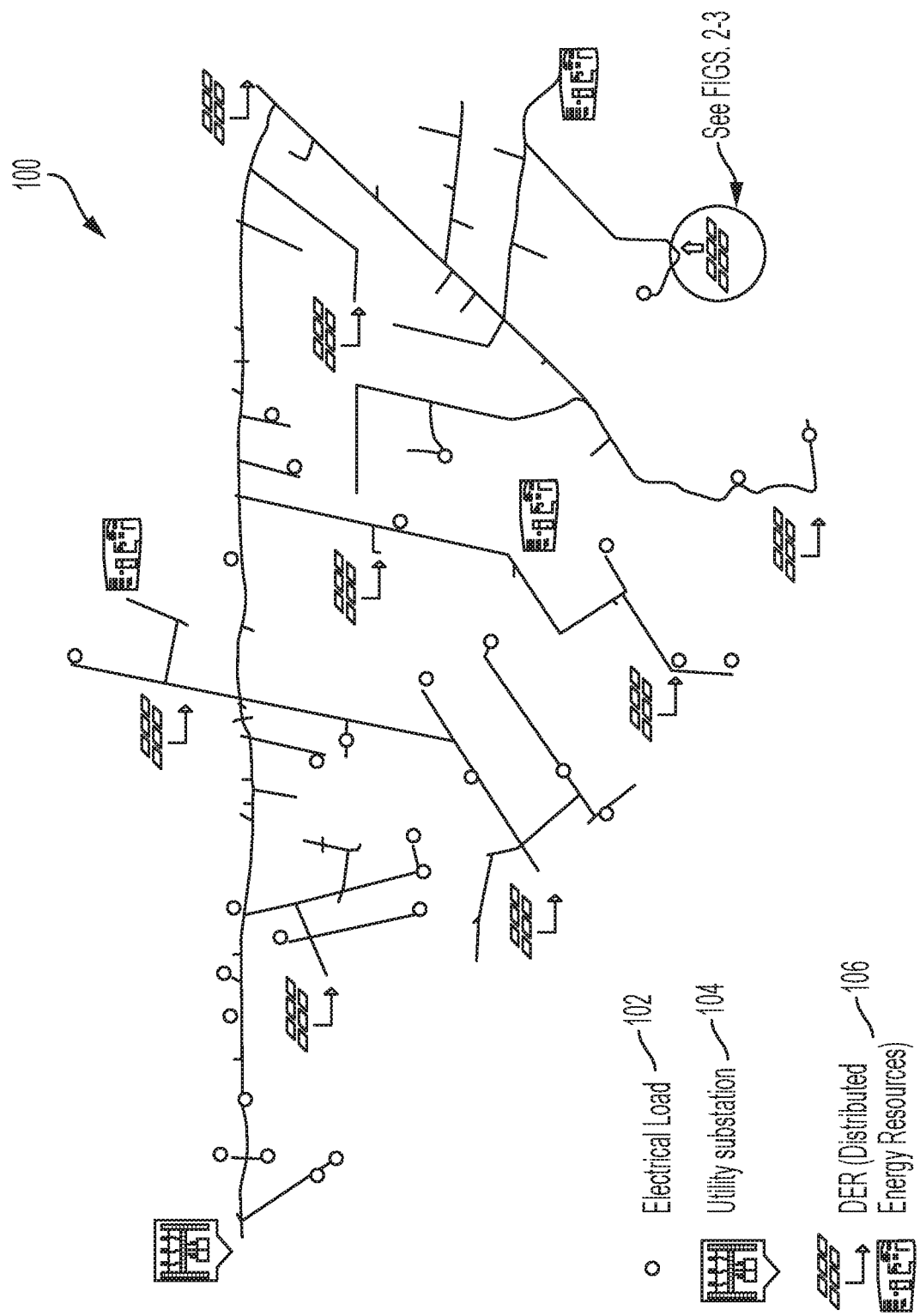
FIG. 1 is a simplified diagram illustrating a subsection of an electrical grid with multiple DERs.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory computer-readable storage medium, which may be read and executed by one or more processors. A computer-readable storage medium may be embodied as any storage device, mechanism, or other physical structure for storing or transmitting information in a form readable by a computing device (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The presently disclosed systems and methods allow DERs to reliably disconnect from the electrical grid under islanding conditions, without requiring the use of DTT equipment. In particular, the presently disclosed systems and methods allow DERs to use a localized Islanding Detection Algorithm (iDA). This algorithm does not require communications between the electrical substation and each DER associated with that substation. Instead, the Islanding Detection Algorithm uses local voltage and current measurements to determine when islanding conditions are present. The Islanding Detection Algorithm continuously calculates a Thévenin impedance using the local voltage and current measurements. In response to an increase in this Thévenin impedance (indicating that the DER is experiencing an islanding condition), the Islanding Detection Algorithm may electrically isolate the DER.

FIG. 1 illustrates, in a simplified diagram, a subsection 100 of an electrical grid which contains multiple DERs 106. In this illustrative embodiment, the subsection 100 includes multiple electrical loads 102, a utility substation 104, and multiple DERs 106. As shown, each of the electrical loads 102, the utility substation 104, and the DERs 106 are electrically connected to each other through a series of power lines. Similar subsections 100 may be connected together along with a power supply to form the remainder of the electrical grid.

The electrical loads 102 may be embodied as any object which consumes electrical power from the subsection 100. For example, the electrical load 102 may be embodied as a residential home, an apartment complex, an office building, a factory, and/or any building or device that consumes electricity from the power lines. The utility substation 104 may be embodied as any type of substation which contributes to the distribution of electrical power in subsection 100. For example, the substation 104 may be embodied as a transmission substation, a distribution substation, a collector substation, or any type of substation used to control the distribution of power. The substation 104 may manipulate the power supply in a variety of ways. For example, the substation 104 may transform the voltage levels from high to low, from low to high, or any other manipulation needed in order to successfully distribute power to consumers. The DERs 106 may be embodied as any decentralized power supply which is electrically connected to subsection 100. By way of illustrative example, DERs 106 may include solar panels, hydro systems, wind turbines, geothermal power systems, biomass power systems, diesel generators, and/or any other systems capable of producing and/or storing electrical power. In many situations, each DER 106 is located near a load 102.

Referring now to FIG. 2, a simplified diagram 200 is shown illustrating the Thévenin equivalent circuit seen by a DER 106 under a normal condition. As used herein, a normal condition refers to a condition of the grid in which the DER 106 is not islanded. A connection device 202 is located between the DER 106 and the utility substation 104. The connection device 202 is typically co-located with the DER 106, but may be otherwise located. As discussed further below, the connection device 202 may use local voltage and current values to determine a Thévenin impedance 206 ($Z_{NET}$) as seen by the DER 106 to implement an Islanding Detection Algorithm. Under a normal condition, the DER 106 sees a smaller Thévenin impedance 206A.

Referring now to FIG. 3, a simplified diagram 300 is shown illustrating the Thévenin equivalent circuit seen by the DER 106 of FIG. 2 under an islanding condition. For instance, the utility substation 104 may have failed (as illustrated in FIG. 3), thereby disconnecting the subsection 100 including the DER 106 from the remainder of the electrical grid. Under an islanding condition, the DER 106 sees a larger Thévenin impedance 206B. As discussed further below, the connection device 202 implementing the Islanding Detection Algorithm may recognize this larger Thévenin impedance 206B as representative of an islanding condition and disconnect the DER 106 from the grid to prevent damage and/or dangerous conditions.

Figure 4B:
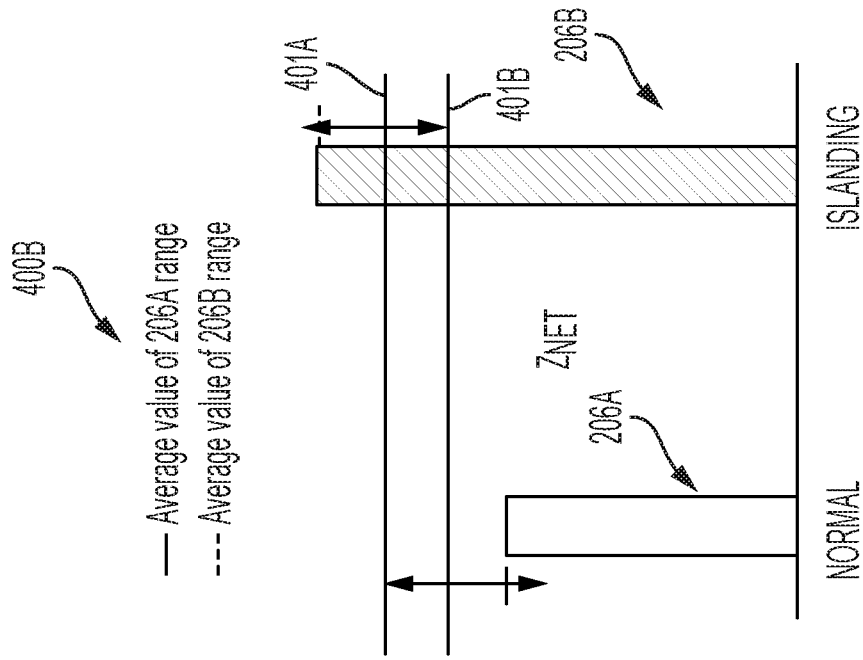
FIG. 4B shows another graph comparing a Thévenin impedance seen by a DER under a normal condition and under an islanding condition.
Figure 4A:
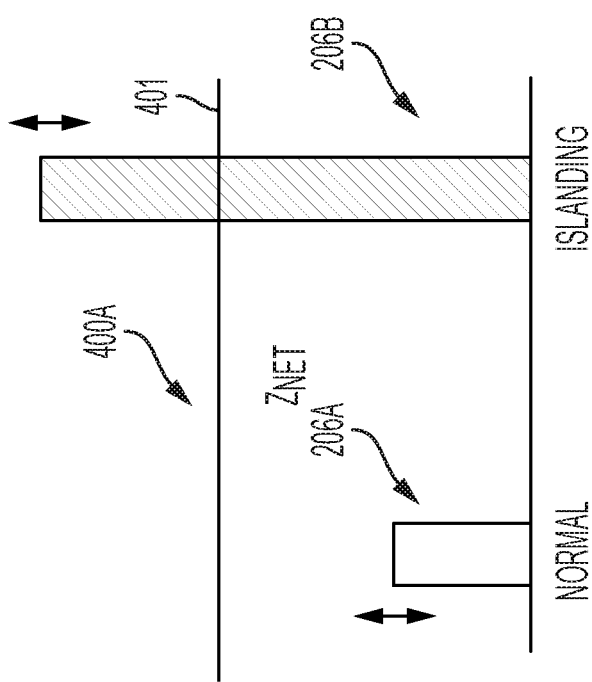
FIG. 4A shows one graph comparing a Thévenin impedance seen by a DER under a normal condition and under an islanding condition.

FIGS. 4A and 4B respectively present illustrative graphs 400A, 400B showing a difference in values between the smaller Thévenin impedance 206A seen by a DER 106 under a normal condition and the larger Thévenin impedance 206B seen by the DER 106 under an islanding condition. In each of graphs 400A, 400B, bar 206A represents an average Thévenin impedance 206A as seen by the DER 106 under a normal condition, while bar 206B represents an average Thévenin impedance 206B as seen by the DER 106 under an islanding condition. Each of these values will fluctuate over time, as indicated by the double-headed arrows in FIGS. 4A-B.

In illustrative embodiments, a user may run a simulation of the distribution circuit 100 of FIG. 1 to appropriately establish a threshold 401 (or thresholds 401A, 401B) for the Thévenin impedance 206 seen by each DER 106. Such threshold(s) 401, 401A, 401B will depend on the location of the DER 106. For each DER 106, the simulation should generally cover all the normal conditions and each of the islanding conditions that may be experienced by that DER 106. As illustrated in FIGS. 4A-B by the double-headed arrows, the actual Thévenin impedance 206 seen by each DER 106 can vary over a range (under both normal and islanding conditions), and those ranges are estimated as part of the computer simulation. In situations in which there is no overlap between the ranges of possible Thévenin impedance values for normal conditions and for islanding conditions, a single threshold 401 can be established, as illustrated in FIG. 4A. In other words, the single threshold 401 is most appropriate where the Thévenin impedance 206A will never exceed the threshold 401 (in all normal conditions) and where the Thévenin impedance 206B will never drop below the threshold 401 (in all islanding conditions). Once the threshold 401 has been established, and programmed into the connection device 202, the DER 106 may monitor for an islanding condition by continuously measuring the voltage and current seen by the DER 106 and determining a corresponding Thévenin impedance 206. If the present Thévenin impedance 206 increases past the threshold 401 for a period of time, then a relay 514 will be opened and the DER 106 will be disconnected from the electrical grid 100.

In other embodiments, the computer simulation performed by the user may indicate that the ranges for the possible values of the Thévenin impedance 206A during normal conditions and for the possible values of the Thévenin impedance 206B during islanding conditions overlap, as illustrated in FIG. 4B. Note that, as depicted in FIG. 4B, even though the average values of the Thévenin impedances 206A, 206B are different from one another, there is at least one islanding condition that (from a Thévenin perspective) resembles a normal condition. In this scenario, the user will pick two thresholds 401A, 401B as a result of the simulation. These thresholds 401A, 401B are both programmed into the connection device 202. The DER 106 continuously tracks the Thévenin impedance 206 based on voltage and current measurement. If the Thévenin impedance 206 is greater than the threshold 401A, the DER 106 recognizes this as an islanding condition. If the Thévenin impedance 206 is less than the threshold 401B, the DER 106 recognizes this as a normal condition. Finally, if the Thévenin impedance 206 is between the two thresholds 401A, 401B, the DER 106 would recognize this as an unknown condition and may need other logics to proceed.

Figure 5:
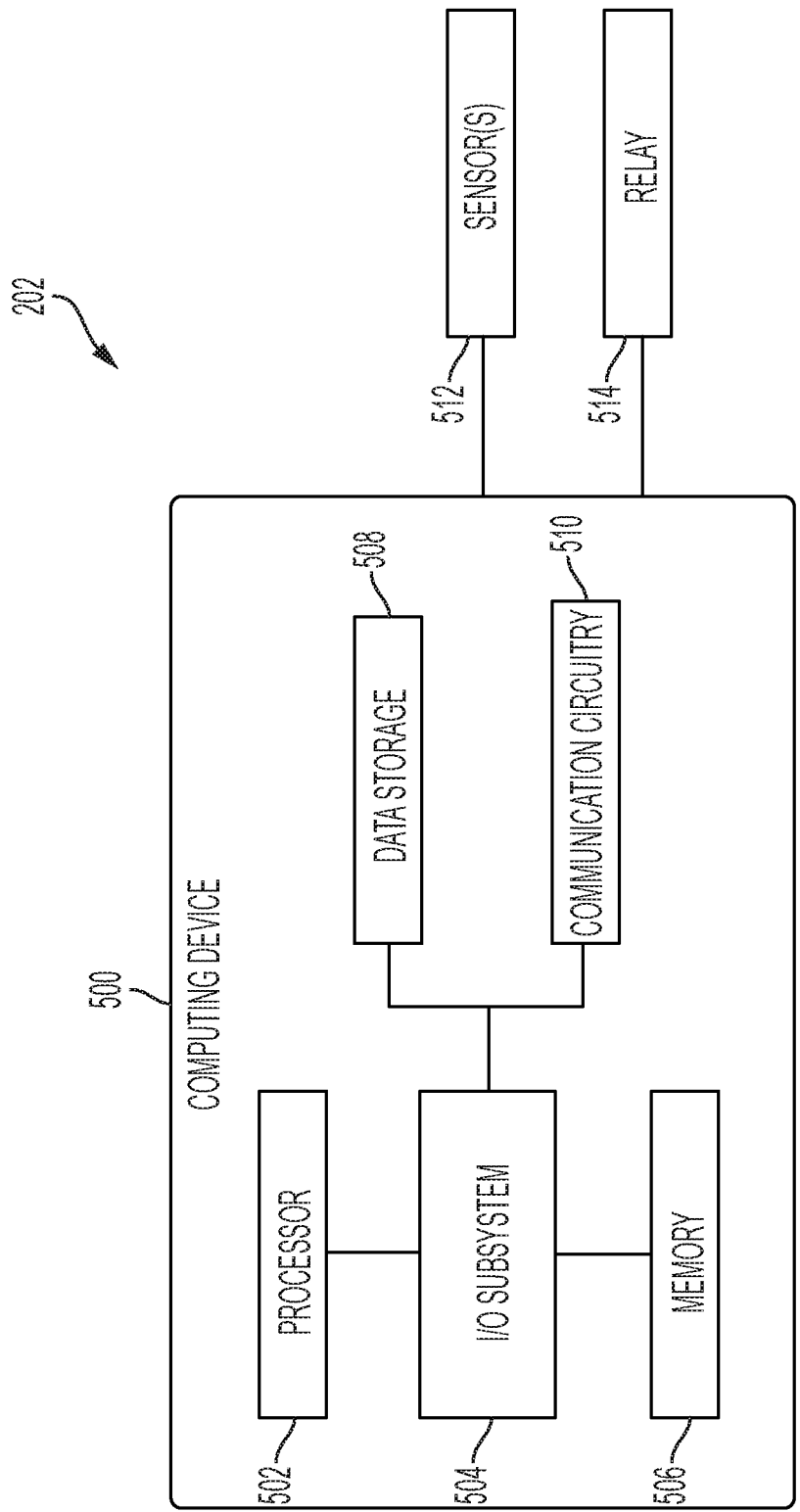
FIG. 5 is a simplified block diagram of a connection device associated with a DER.

Referring now to FIG. 5, an illustrative embodiment of a connection device 202 for implementing an Islanding Detection Algorithm is shown. As discussed above in conjunction with FIGS. 2 and 3, the connection device 202 is located between the DER 106 and the utility substation 104 and electrically connects (or disconnects) those components. In the illustrative embodiment, the connection device 202 is embodied as a smart inverter. In other embodiments, the connection device 202 may be embodied as a microprocessor-based controller.

In the illustrative embodiment of FIG. 5, the connection device 202 includes a computing device 500, one or more sensor(s) 512, and a relay 514. The computing device 500 may be embodied as any type of computing device/component capable of performing the functions described herein. For example, the computing device 500 may be embodied, for example, as an embedded system, a personal computer, a server, an Internet of Things (IoT) device, and/or any other suitable computing/communication device. As shown in FIG. 5, the illustrative computing device 500 includes a processor 502, an input/output ("I/O") subsystem 504, a memory 506, a data storage 508, and a communication circuitry 510. The computing device 500 may include and/or be electrically or communicatively coupled to the one or more sensor(s) 512 and the relay 514. Depending on the particular embodiment, the sensor(s) 512 or relay 514 may be incorporated into the computing device 500 or may be located outside of the computing device 500 and coupled to the computing device 500. Of course, the computing device 500 may include other or additional components, such as those commonly found in a typical computing device or controller (e.g., various input/output devices and/or other components), in other embodiments. Additionally, in some embodiments, one or more of the illustrative components may be incorporated in, or otherwise form a portion of, another component. For example, the memory 506, or portions thereof, may be incorporated in the processor 502 in some embodiments.

The processor 502 may be embodied as any type of processor capable of performing the functions described herein. For example, the processor 502 may be embodied as a single or multi-core processor(s), digital signal processor, microcontroller, or other processor or processing/controlling circuit. Similarly, the memory 506 may be embodied as any type of volatile or non-volatile memory or data storage capable of performing the functions described herein. In operation, the memory 506 may store various data and software used during operation of the computing device 500 such as operating systems, applications, programs, libraries, and drivers. The memory 506 is communicatively coupled to the processor 502 via the I/O subsystem 504, which may be embodied as circuitry and/or components to facilitate input/output operations with the processor 502, the memory 506, and other components of the computing device 500. For example, the I/O subsystem 504 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The data storage 508 may be embodied as any type of device or devices configured for short-term or long-term storage of data such as, for example, memory devices and circuits, memory cards, hard disk drives, solid-state drives, or other data storage devices. The data storage 508 and/or the memory 506 may store various data during operation of the computing device 500 as described herein.

The communication circuitry 510 may be embodied as any communication circuit, device, or collection thereof, capable of enabling communications between the computing device 500 and other remote devices. However, it should be appreciated that the communication circuitry 510 may be configured to use any one or more communication technologies (e.g., wireless or wired communications) and associated protocols (e.g., Ethernet, Bluetooth®, Wi-Fi®, WiMAX, etc.) to effect such communication.

The sensor(s) 512 generate, produce, or output sensor data based on a measured signal indicative of the environment (e.g., hardware, firmware, and/or software environment) and/or context of the monitored bus. For example, as described below, the sensor(s) 512 may produce sensor data that may be utilized by the computing device 500 to determine whether an islanding condition has occurred (e.g., by monitoring voltage, current, temperature, etc.). In various embodiments, the sensor(s) 512 may be embodied as, or otherwise include, for example, voltage sensors, current sensors, impedance sensors, capacitance sensors, temperature sensors, image sensors, communication sensors, piezoelectric sensors, optical sensors, light sensors, audio sensors, inertial sensors, proximity sensors, motion sensors, pressure sensors, software sensors, and/or other types of sensors that generate data useful to the computing device 500, which may vary depending on the particular connection device 202. In some embodiments, one or more of the sensor(s) 512 may be embodied as a communication circuit configured to receive external sensor data and information. For example, as described below, in some embodiments, the sensor(s) 512 and/or another circuit may be configured to receive fault indication signals (e.g., indicating a fault or confirmation of fault isolation) from upstream and/or downstream computing devices.

The relay 514 is an electrically operated switch which changes between open and closed states. For example, as described below, the relay 514 may determine its state based on received input from computing device 500. When in the closed state, the relay 514 electrically connects two or more components. When in the open state, the relay 514 electrically disconnects those components. In various embodiments, the relay 514 may be embodied as, or otherwise include, for example, coaxial relays, Contactor Latching relays, mercury relays, multi-voltage relays, overload protection relays, polarized relays, Reed relays, solid-state relays, vacuum relays, and/or other types of electronic switches that may receive input from the computing device 500, which may vary depending on the particular connection device 202.

The connection device 202 may include additional components and/or devices configured to facilitate the use of the computing device 500, the sensor(s) 512, and the relay 514. It is contemplated that, in some embodiments, the sensor(s) 512 and/or the relay 514 may be located outside the connection device 202, elsewhere in the subsection 100 of the electrical grid, and configured to transmit the generated sensor data to the computing device 500 for analysis.

Figure 6:
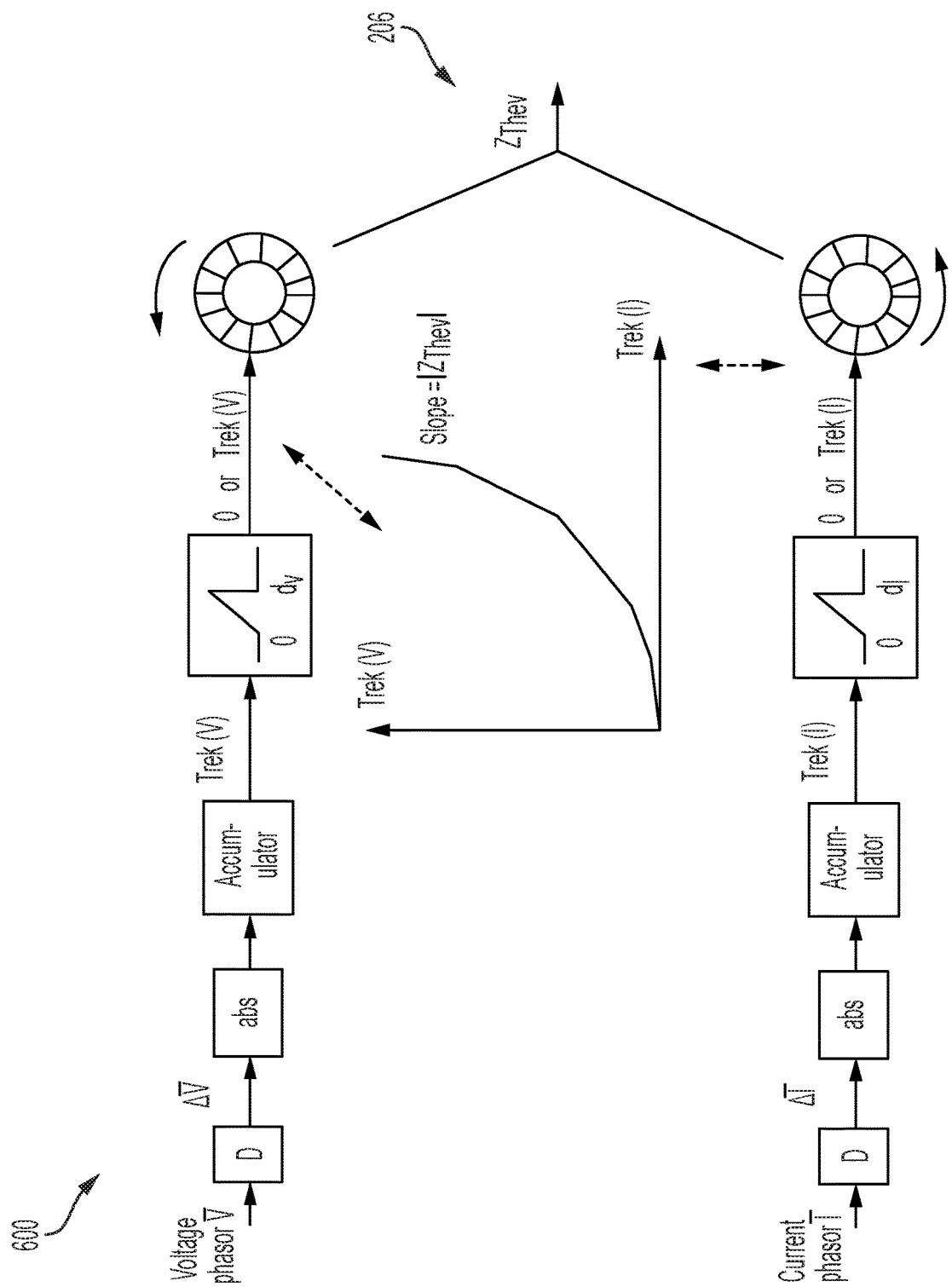
FIG. 6 schematically depicts a data processing circuit for computing Thévenin impedance.

As mentioned above, each connection device 202 may use local voltage and current values to determine the Thévenin impedance 206 ($Z_{NET}$) seen by the associated DER 106 in order to implement an Islanding Detection Algorithm. In the illustrative embodiment, the connection device 202 utilizes one or more of the methods for determining Thévenin impedance taught in U.S. Pat. Nos. 6,219,591 and 6,249,719, the entire disclosures of which are incorporated by reference into this disclosure. For example, in the illustrative embodiment, the computing device 500 of the connection device 202 may execute a method 600 illustrated in FIG. 6 to determine the Thévenin impedance 206 ($Z_{Thev}$) as seen by the associated DER 106. As shown in FIG. 6, each of blocks 602, 604, 606, 608, and 610 correspond to determining Trek(V), which represents a rolling sum of ΔV, or the total distance in the V-plane traveled up to time t. Similarly, each of blocks 612, 614, 616, 616, and 620 correspond to determining Trek(I), which represents a rolling sum of ΔI, or the total distance in the I-plane traveled up to time t. Circular arrays are used to store selected values of Trek(V) and Trek(I). The method 600 is used to calculate a Thévenin impedance 206 for n time entries. In the illustrative embodiment, n equals 2, so Trek(V) is equal to ΔV and Trek(I) is equal to ΔI. In other embodiments, n may be equal to any positive number.

During the method 600, each measured voltage phasor is input into block 602. In block 602, the difference between the previous voltage phasor and the most recent voltage phasor is determined. The output of block 602 is ΔV. In block 604, the absolute value of ΔV is determined. In block 606, the accumulator adds the absolute value of ΔV output by block 604 to a rolling sum of all ΔV up until the current time. In this embodiment, there are only two time values, so a single absolute value of ΔV is outputted from block 606 as Trek(V). In block 608, Trek(V) is checked for erroneous data entries. If the absolute value of ΔV is greater than a prescribed threshold $d_v$ or the absolute value of ΔI is greater than a prescribed threshold $d_I$, then the absolute value of ΔV is stored in array 610.

During the method 600, each measured current phasor is input into block 612. In block 612, the difference between the previous current phasor and the most recent current phasor is determined. The output of block 612 is ΔI. In block 614, the absolute value of ΔI is determined. In block 616, the accumulator adds the absolute value of ΔI output by block 614 to a rolling sum of all ΔI up until the current time. In this embodiment, there are only two time values, so a single absolute value of ΔI is outputted from block 616 as Trek(I). In block 618, Trek(I) is checked for erroneous data entries. If the absolute value of ΔV is greater than a prescribed threshold $d_v$ or the absolute value of ΔI is greater than a prescribed threshold $d_I$, then the absolute value of ΔV is stored in array 620.

The values stored in the array 610 and 620 are used to determine the Thévenin impedance 206, using the following relationship:

$$\|Z_{NET}\| = \frac{\|\Delta \vec{V}\|}{\|\Delta \vec{I}\|}$$

The graph 624 represents Trev(V) over Trek(I) for n values of t. The slope of graph 624 represents the Thévenin impendence 206. Graph 624 shows that the larger the change in measured voltage relative to the change in measured current during the same time period, the greater the Thévenin impendence 206 seen by the DER 106.

Figure 7:
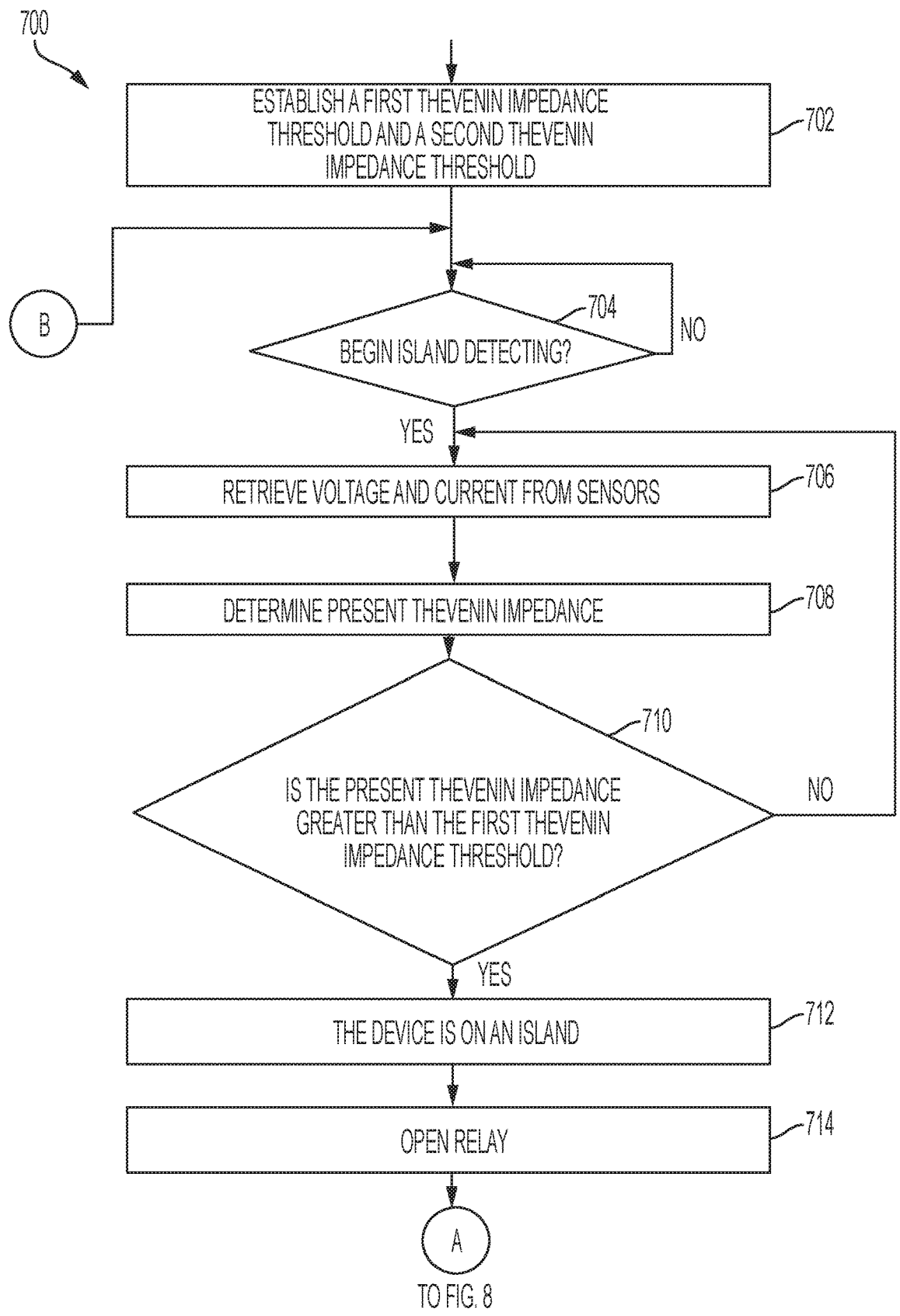
FIG. 7 is a simplified flow diagram of a method for detecting and responding to islanding that may be executed by the computing device in FIG. 5.

One illustrative embodiment of a method 700 for detecting and responding to islanding, which may be executed by the computing device 500 of the connection device 202, is illustrated as a simplified flow diagram in FIG. 7. The method 700 begins with block 702 in which the computing device 500 is programmed with a first Thévenin impedance threshold 401, 401A and (optionally) a second Thévenin impedance threshold 401B. As discussed above, the threshold(s) 401, 401A, 401B, are the result of one or more simulations performed for the associated DER 106 using data representing each of the normal conditions and each of the islanding conditions that may be experienced by that DER 106. The simulation(s) may determine one range of Thévenin impedances expected to be seen by the DER 106 under normal conditions and another range of Thévenin impedances expected to be seen by the DER 106 under islanding conditions. The first Thévenin impedance threshold 401, 401A may be a value that is chosen to signify when the DER 106 has transitioned from a normal condition to an islanding condition. Similarly, the second Thévenin impedance threshold 401, 401B may be a value that is chosen to signify when the DER 106 has transitioned from an islanding condition back to a normal condition. The first and the second Thévenin impedance thresholds may be the same value or different values, depending on the embodiment (compare FIGS. 4A and 4B). It will be appreciated that the Thévenin impedance threshold(s) 401, 401A, 401B used for each DER 106 may be different depending on the location of the DER 106 on the grid and may change over time.

After the computing device 500 has been programmed with the first Thévenin impedance threshold 401, 401A and (optionally) the second Thévenin impedance threshold 401, 401B, the method 700 advances to block 704, in which the computing device 500 determines whether to begin monitoring for an islanding condition. To do so, the computing device 500 may prompt a user or may determine if the DER 106 is connected to the electrical grid and automatically begin monitoring.

If the computing device 500 begins monitoring for an islanding condition, the method 700 advances to block 706 in which the computing device 500 retrieves local voltage and current data from sensor(s) 512. In block 708, the computing device 500 determines the present Thévenin impedance 206 seen by the DER 106 from the measured voltage and current data. In the illustrative embodiment, block 708 of the method 700 involves the computing device 500 executing the method 600 discussed above (and illustrated in FIG. 6). In other embodiments, other methods for determining the present Thévenin impedance 206 seen by the DER 106 may be used.

In block 710, the computing device 500 determines if the present Thévenin impedance is greater than the first Thévenin impedance threshold 401, 401A. If the present Thévenin impedance 206 is not greater than the first Thévenin impedance threshold 401, 401A, then the DER 106 is operating under a normal condition and method 700 returns to block 706 and retrieves new voltage and current data. If the present Thévenin impedance 206 is greater than the first Thévenin impedance threshold 401, 401A, the method 700 advances to block 712. In block 712, the computing device 500 determines that the DER 106 has been islanded from the main electrical grid. As such, the method 700 proceeds to block 714, in which the computing device 500 sends a signal causing the relay 514 to open. When the relay 514 opens, the DER 106 is disconnected from the grid.

Figure 8:
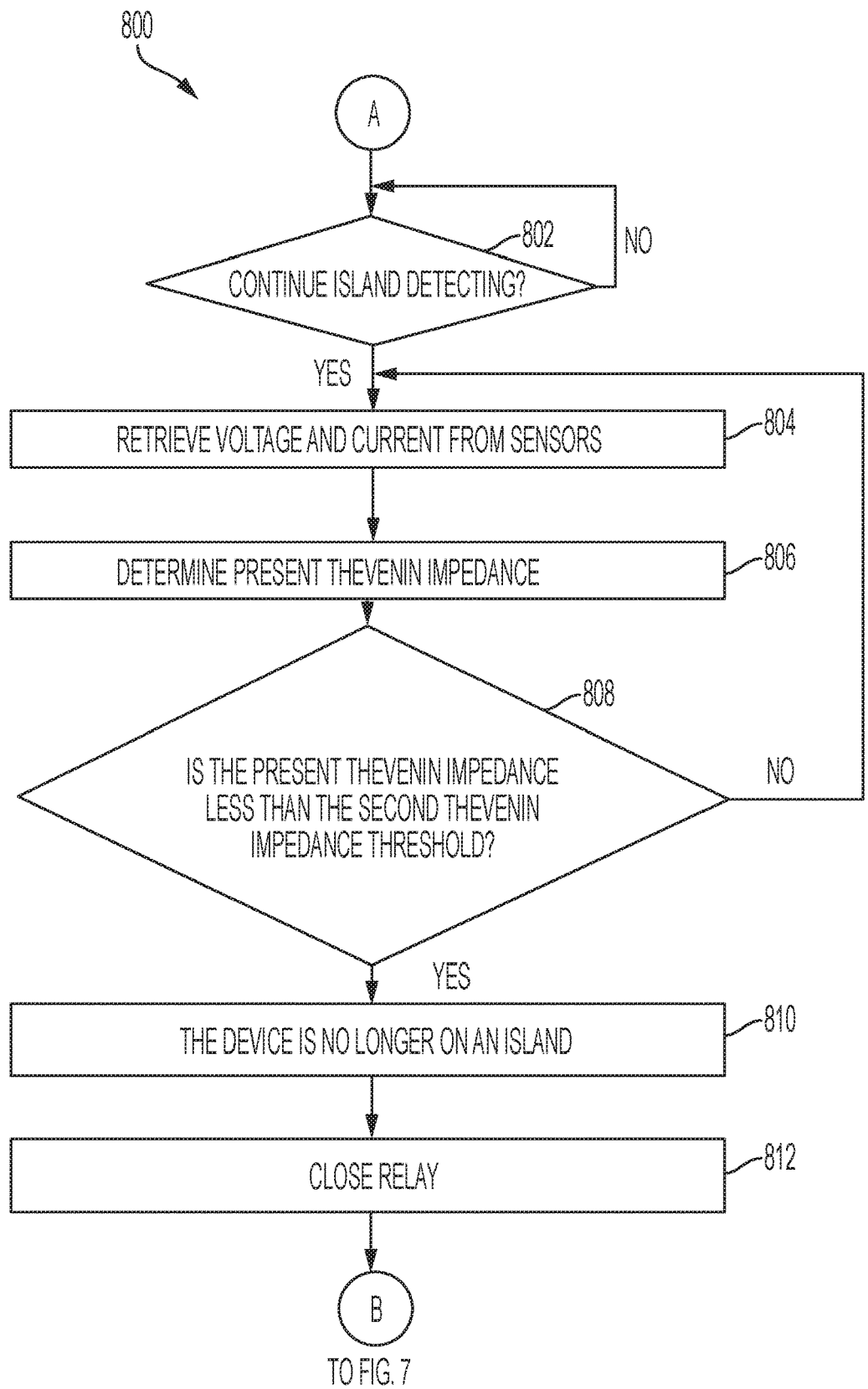
FIG. 8 is a simplified flow diagram of another method for detecting and responding to islanding that may be executed by the computing device in FIG. 5.

Another illustrative embodiment of a method 800 for detecting and responding to islanding, which may be executed by the computing device 500 of the connection device 202, is illustrated as a simplified flow diagram in FIG. 8. In some embodiments, the computing device 500 may proceed to execute the method 800 after execution of block 714 in the method 700. In block 802 of method 800, the computing device 500 determines whether to begin monitoring for a normal condition. In some embodiments, the computing device 500 may automatically begin monitoring for a normal condition after having detecting an islanding condition using the method 700. In other embodiments, the computing device 500 may await a user prompt in block 802.

After block 802, the method 800 advances to block 804 in which the computing device 500 retrieves local voltage and current data from sensor(s) 512. In block 806, the computing device 500 determines the present Thévenin impedance 206 seen by the DER 106 from the measured voltage and current data. In the illustrative embodiment, block 806 of the method 800 involves the computing device 500 executing the method 600 discussed above (and illustrated in FIG. 6). In other embodiments, other methods for determining the present Thévenin impedance 206 seen by the DER 106 may be used.

In block 808, the computing device 500 determines if the present Thévenin impedance 206 is less than the second Thévenin impedance threshold 401, 401B. If the present Thévenin impedance 206 is not less than the second Thévenin impedance threshold 401, 401B, then the DER 106 is still operating under an islanding condition and method 800 returns to block 804 and retrieves new voltage and current data. If the present Thévenin impedance 206 is less than the second Thévenin impedance threshold 401, 401B, the method 800 advances to block 810. In block 810, the computing device 500 determines that the subsection 100 including the DER 106 has been reconnected to the main electrical grid. As such, the method 800 proceeds to block 812, in which the computing device 500 sends a signal causing the relay 514 to close. When the relay 514 closes, the DER 106 is reconnected to the grid. After the DER 106 has been reconnected, the computing device 500 may return to executing the method 700.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A method comprising:
   measuring voltage and current at a connection point between a distributed energy resource and an electrical grid;
   determining a Thévenin impedance of the electrical grid based upon the voltage and current measurements;
   setting a predetermined threshold, wherein setting the predetermined threshold comprises:
      determining a first range of possible values for the Thévenin impedance under a normal condition using a computer simulation;
      determining a second range of possible values for the Thévenin impedance under an islanding condition using a computer simulation; and
      determining whether an overlap exists between the first and second ranges of possible values for the Thévenin impedance; and
   determining whether the Thévenin impedance has exceeded the predetermined threshold.

2. The method of claim 1, further comprising disconnecting the distributed energy resource from the electrical grid in response to determining that the Thévenin impedance has exceeded the predetermined threshold.

3. The method of claim 2, further comprising:
   determining, in response to disconnecting the distributed energy resource from the electrical grid, a subsequent Thévenin impedance of the electrical grid; and
   re-connecting, in response to determining that the subsequent Thévenin impedance is below the predetermined threshold, the distributed energy resource to the electrical grid.

4. The method of claim 1, further comprising setting the predetermined threshold based at least on a location of the distributed energy resource.

5. The method of claim 1, further comprising:
   setting, in response to determining that the overlap exists, a first predetermined threshold and a second predetermined threshold;
   determining whether the Thévenin impedance has exceeded the first predetermined threshold; and
   disconnecting the distributed energy resource from the electrical grid in response to determining that the Thévenin impedance has exceeded the first predetermined threshold.

6. The method of claim 5, further comprising:
   determining, in response to disconnecting the distributed energy resource from the electrical grid, a subsequent Thévenin impedance of the electrical grid;
   determining whether the Thévenin impedance has exceeded the second predetermined threshold; and
   re-connecting, in response to determining that the subsequent Thévenin impedance is below the second predetermined threshold, the distributed energy resource to the electrical grid.

7. The method of claim 1, wherein the normal condition includes the distributed energy resource providing power to the electrical grid, and wherein the islanding condition includes the distributed energy resource continuing to provide power to a subsection of the electrical grid after the subsection of the electrical grid has been isolated from a remainder of the electrical grid.

8. The method of claim 1, wherein the distributed energy resource includes at least one of a solar panel, a hydro system, a wind turbine, a geothermal power system, a biomass power system, and a diesel generator.

9. A system comprising:

a distributed energy resource; and a connection device coupled to the distributed energy resource to control distribution of power from the distributed energy resource to an electrical grid, wherein the connection device is configured to:
- measure voltage and current at a connection point between the distributed energy resource and the electrical grid;
- determine a Thévenin impedance of the electrical grid based upon the voltage and current measurements;
- set a predetermined threshold, wherein to set the predetermined threshold comprises to:
  - determine a first range of possible values for the Thévenin impedance under a normal condition using a computer simulation;
  - determine a second range of possible values for the Thévenin impedance under an islanding condition using a computer simulation; and
  - determine whether an overlap exists between the first and second ranges of possible values for the Thévenin impedance; and
- determine whether the Thévenin impedance has exceeded the predetermined threshold.

10. The system of claim 9, wherein the connection device is further configured to disconnect the distributed energy resource from the electrical grid in response to a determination that the Thévenin impedance has exceeded the predetermined threshold.

11. The system of claim 10, wherein the connection device is further configured to:
- determine, in response to a disconnection of the distributed energy resource from the electrical grid, a subsequent Thévenin impedance of the electrical grid; and
- re-connect, in response to a determination that the subsequent Thévenin impedance is below the predetermined threshold, the distributed energy resource to the electrical grid.

12. The system of claim 9, wherein the connection device is further configured to set the predetermined threshold based at least on a location of the distributed energy resource.

13. The system of claim 9, wherein the connection device is further configured to:
- set, in response to a determination that the overlap exists, a first predetermined threshold and a second predetermined threshold;
- determine whether the Thévenin impedance has exceeded the first predetermined threshold; and
- disconnect the distributed energy resource from the electrical grid in response to a determination that the Thévenin impedance has exceeded the first predetermined threshold.

14. The system of claim 13, wherein the connection device is further configured to:
- determine, in response to a disconnection of the distributed energy resource from the electrical grid, a subsequent Thévenin impedance of the electrical grid;
- determine whether the Thévenin impedance has exceeded the second predetermined threshold; and
- re-connect, in response to a determination that the subsequent Thévenin impedance is below the second predetermined threshold, the distributed energy resource to the electrical grid.

15. The system of claim 9, wherein the normal condition includes the distributed energy resource providing power to the electrical grid, and wherein the islanding condition includes the distributed energy resource continuing to provide power to a subsection of the electrical grid after the subsection of the electrical grid has been isolated from a remainder of the electrical grid.

16. The system of claim 9, wherein the distributed energy resource includes at least one of a solar panel, a hydro system, a wind turbine, a geothermal power system, a biomass power system, and a diesel generator.

* * * * *